US009952747B1

(12) United States Patent
Russell et al.

(10) Patent No.: US 9,952,747 B1
(45) Date of Patent: Apr. 24, 2018

(54) UPDATING DATA FIELDS IN A USER INTERFACE

(71) Applicant: Amazon Technologies, Inc., Reno, NV (US)

(72) Inventors: Ryan Scott Russell, Bellevue, WA (US); Justin David Kelly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 565 days.

(21) Appl. No.: 14/035,587

(22) Filed: Sep. 24, 2013

(51) Int. Cl.
*G06F 17/00* (2006.01)
*G06F 3/0484* (2013.01)
*G06F 9/44* (2018.01)

(52) U.S. Cl.
CPC .......... *G06F 3/0484* (2013.01); *G06F 9/4443* (2013.01)

(58) Field of Classification Search
CPC ............................. G06F 9/4443; G06F 3/0484
USPC ........ 715/221, 223, 273, 744, 764, 768, 700
See application file for complete search history.

(56) References Cited

U.S. PATENT DOCUMENTS

| | | | | |
|---|---|---|---|---|
| 8,905,315 B1* | 12/2014 | Qureshi | ............. | G06Q 10/1095 235/375 |
| 9,009,669 B2* | 4/2015 | Pletter | ................. | G06F 11/3688 717/106 |
| 9,171,278 B1* | 10/2015 | Kong | ................... | G06Q 10/087 |
| 9,310,974 B1* | 4/2016 | Narayanan | ............ | G06F 3/0484 |
| 9,336,753 B2* | 5/2016 | Leventhal | ........... | G06F 3/04812 |
| 9,351,237 B2* | 5/2016 | Selim | .................... | G06F 3/1438 |
| 9,542,202 B2* | 1/2017 | Ording | ................ | G06F 3/04883 |
| 2003/0169301 A1* | 9/2003 | McCauley | ........... | G08G 5/0021 715/810 |
| 2004/0017393 A1* | 1/2004 | Easwar | ............... | G06F 17/3028 715/744 |
| 2004/0039706 A1* | 2/2004 | Skowron | ................ | G06Q 10/10 705/51 |
| 2007/0009179 A1* | 1/2007 | Easwar | ............... | G06F 17/3028 382/276 |
| 2007/0150364 A1* | 6/2007 | Monaghan | ............. | G06Q 10/10 705/26.1 |
| 2007/0150383 A1* | 6/2007 | Shakes | ............... | G06Q 10/0875 705/29 |
| 2008/0133572 A1* | 6/2008 | Verhey-Henke | ...... | G06F 17/248 |
| 2008/0244381 A1* | 10/2008 | Nicolaou | ............ | G06F 17/2745 715/234 |
| 2009/0063128 A1* | 3/2009 | Seo | ...................... | G06F 17/2872 704/2 |
| 2009/0094555 A1* | 4/2009 | Viitala | .............. | H04M 1/72544 715/838 |

(Continued)

OTHER PUBLICATIONS

Francisso-Revilla et al., Managing Conflict in Multi-model Adaptive Hypertext, ACM 2004, pp. 237-238.*

(Continued)

*Primary Examiner* — Cong-Lac Huynh
(74) *Attorney, Agent, or Firm* — Thomas Horstemeyer, LLP

(57) ABSTRACT

Disclosed are various implementations for updating information displayed in a user interface containing structured data fields. Information changing relative to a previous user interface is emphasized. Information remaining unchanged relative to the previous user interface can be deemphasized.

19 Claims, 6 Drawing Sheets

(56) References Cited

U.S. PATENT DOCUMENTS

| | | | | |
|---|---|---|---|---|
| 2009/0222719 | A1* | 9/2009 | Croft | G06Q 10/10 715/229 |
| 2010/0122193 | A1* | 5/2010 | Lange | G06T 13/00 715/765 |
| 2010/0318892 | A1* | 12/2010 | Teevan | G06F 17/3089 715/229 |
| 2011/0093446 | A1* | 4/2011 | Dearborn | G06F 17/30864 707/706 |
| 2011/0167366 | A1* | 7/2011 | Wagner | G06F 3/0483 715/765 |
| 2012/0054672 | A1* | 3/2012 | McDowell | G09B 17/003 715/784 |
| 2012/0092340 | A1* | 4/2012 | Sarnoff | G06T 11/203 345/420 |
| 2013/0073964 | A1* | 3/2013 | Meaney | G11B 27/34 715/716 |
| 2013/0187927 | A1* | 7/2013 | Weinmann | G09B 5/06 345/473 |
| 2014/0089776 | A1* | 3/2014 | Pilskalns | G06F 17/30241 715/230 |
| 2014/0181707 | A1* | 6/2014 | Tamberg | G06F 9/4443 715/765 |
| 2014/0278549 | A1* | 9/2014 | Fritsch | G06F 19/322 705/3 |
| 2014/0304002 | A1* | 10/2014 | Fritsch | G06F 19/3425 705/3 |
| 2014/0304077 | A1* | 10/2014 | Wingle | G06Q 30/0241 705/14.61 |
| 2014/0310697 | A1* | 10/2014 | Reddish | G06F 8/443 717/154 |
| 2014/0320896 | A1* | 10/2014 | Srivatsan | G06F 3/1204 358/1.15 |
| 2014/0359472 | A1* | 12/2014 | Lefor | H04M 1/72569 715/746 |
| 2015/0046298 | A1* | 2/2015 | Zwakhals | G06Q 10/087 705/28 |
| 2015/0142771 | A1* | 5/2015 | Bhagat | G06F 17/30864 707/706 |
| 2015/0188970 | A1* | 7/2015 | Kowshik | H04L 65/602 715/204 |
| 2016/0353177 | A1* | 12/2016 | Gordon | H04N 21/482 |

OTHER PUBLICATIONS

Nguyen et al., A Focus+Context Visualization Technique Using Semi-Transparency, IEEE 2004, pp. 1-8.*
Correa et al., Illustrative Deformation for Data Exploration, IEEE 2007, pp. 1320-1327.*
Warrick et al., A VRML-Based Anatomical Visualization Tool for Medical Education, IEEE 1998, pp. 55-61.*
Janecek et al., A Framework for Designing Fisheye Views to Support Multiple Semantic Contexts, ACM 2002, pp. 51-58.*
Dhond et al., Data Mining Techniques for Optimizing Inventories for Electronic Commerce, ACM 2000, pp. 480-486.*

* cited by examiner

UPDATING DATA FIELDS IN A USER INTERFACE

BACKGROUND

Devices having a display upon which a user interface can be displayed are employed in many environments. As one example, a user interface is rendered upon a display of a handheld barcode scanner with information to inform personnel in a fulfillment center with pertinent information relating to a task within the fulfillment center. As another example, a user interface can be rendered upon a display of a handheld device of delivery personnel with information regarding a delivery the personnel may be making.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating and/or rendering a user interface upon a display of a device that displays information related to various types of tasks. For example, a task can be related to the fulfillment process of electronic commerce orders by personnel in a fulfillment center. Such a task can also be related delivery of a parcel by a package delivery service. As yet another example, a user interface in the context of the present disclosure can display information related to stock quotes, financial indexes, banking information, or any other type of information that can be displayed in a user interface.

Such a user interface can also comprise structured data fields where each data field displays a particular field of data related to a particular task or piece of information displayed by the user interface. For example, the data fields can correspond to the location of an item within a fulfillment center so that fulfillment center personnel can locate the item and retrieve the item for shipment to a user or a customer of an electronic commerce system who has purchased the item via an electronic commerce system. In this scenario, the user interface may be rendered upon the display of a handheld scanner device that includes an integrated barcode scanner and/or image capture device that allows personnel to scan the item and/or a bin in which the item is located, signifying that the item has been retrieved, after which the user interface is updated with information about the location of the next item that the user is directed to retrieve. In some embodiments, an item, bin and/or location within a fulfillment center can be detected by the handheld device via radio frequency identification (RFID) and/or near field communication (NFC) tags that are scanned by an integrated RFID and/or NFC scanner in the handheld device.

In the above example related to retrieval of items from a fulfillment center, retrieval of the items involves a potentially repetitive series of tasks that requires personnel in the fulfillment center to perceive information from a user interface that includes data fields that are frequently updating and providing information about a next task. Accordingly, embodiments of the present disclosure are directed to user interfaces that can be updated in such as way so as to facilitate user perception of information conveyed via such a user interface.

Figure 1A:
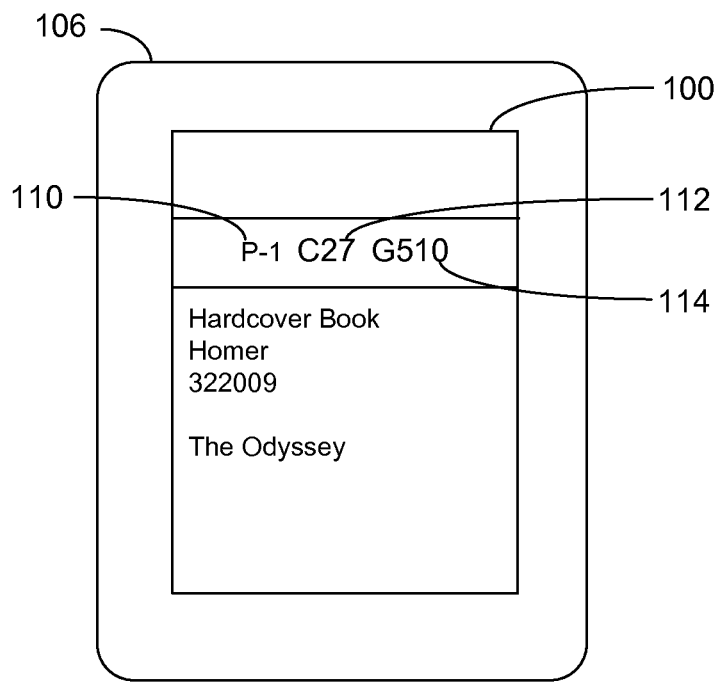
FIG. 1A is drawing depicting a user interface depicting a user interface element that is rendered and facilitated by embodiments of the present disclosure.

Accordingly, reference is now made to FIG. 1A, in which a user interface 100 that is rendered upon the display of a client device 106 is shown. The depicted user interface 100 can be facilitated by embodiments of the disclosure. In the example of FIG. 1A, the user interface displays structured information that can be rendered upon the display of the client device 106 that is a handheld scanner device that facilitates fulfillment of orders from a fulfillment center by directing workers in the fulfillment center to retrieve a particular item for shipment.

Accordingly, as shown in FIG. 1A, the user interface 100 depicts information relating to the location of an item in the fulfillment center so that a worker can locate and retrieve the item. In the depicted example, the information is displayed in the user interface 100 in multiple data fields. Information about a floor identifier 110 corresponding to a floor of a fulfillment center, a row identifier 112 corresponding to a row or other type of location within the fulfillment center, and a bin identifier 114 corresponding to a bin within the fulfillment center are shown in the user interface 100. Accordingly, in this example, an application executed by the client device 106 can render the user interface 100 in response to information stored locally and/or retrieved from another application that facilitates fulfillment via a network. The information associated with the location of the item is populated or placed into the data fields within the user interface and rendered upon the display of the client device 106.

Figure 1B:
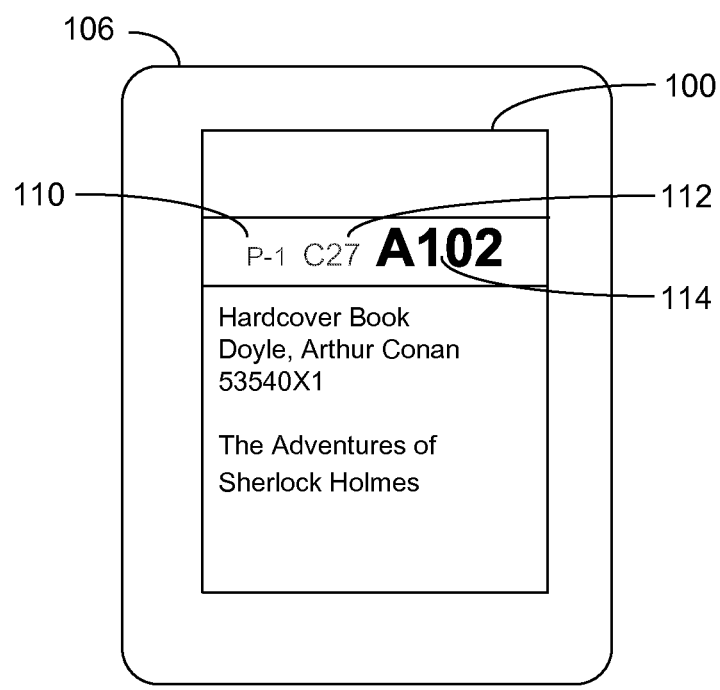
FIG. 1B is drawing depicting a user interface depicting a user interface element that is rendered and facilitated by embodiments of the present disclosure.

Accordingly, reference is now made to FIG. 1B, which continues the example of FIG. 1A. In the example of FIG. 1B, the user interface 100 displays information about the next item in the fulfillment center that a worker can be tasked to retrieve. In the example of FIG. 1B, the floor identifier 110 and row identifier 112 are deemphasized because the next item is located on the same floor and in the same row as the item associated with the user interface 100 of FIG. 1A. The bin identifier 114 is emphasized because the next item is located in a different bin than the item associated with the user interface 100 of FIG. 1A. In this way, information that has changed can be emphasized, and information that remains unchanged can be deemphasized as the user interface 100 is updated with information about a task that a user may be performing.

Figure 2:
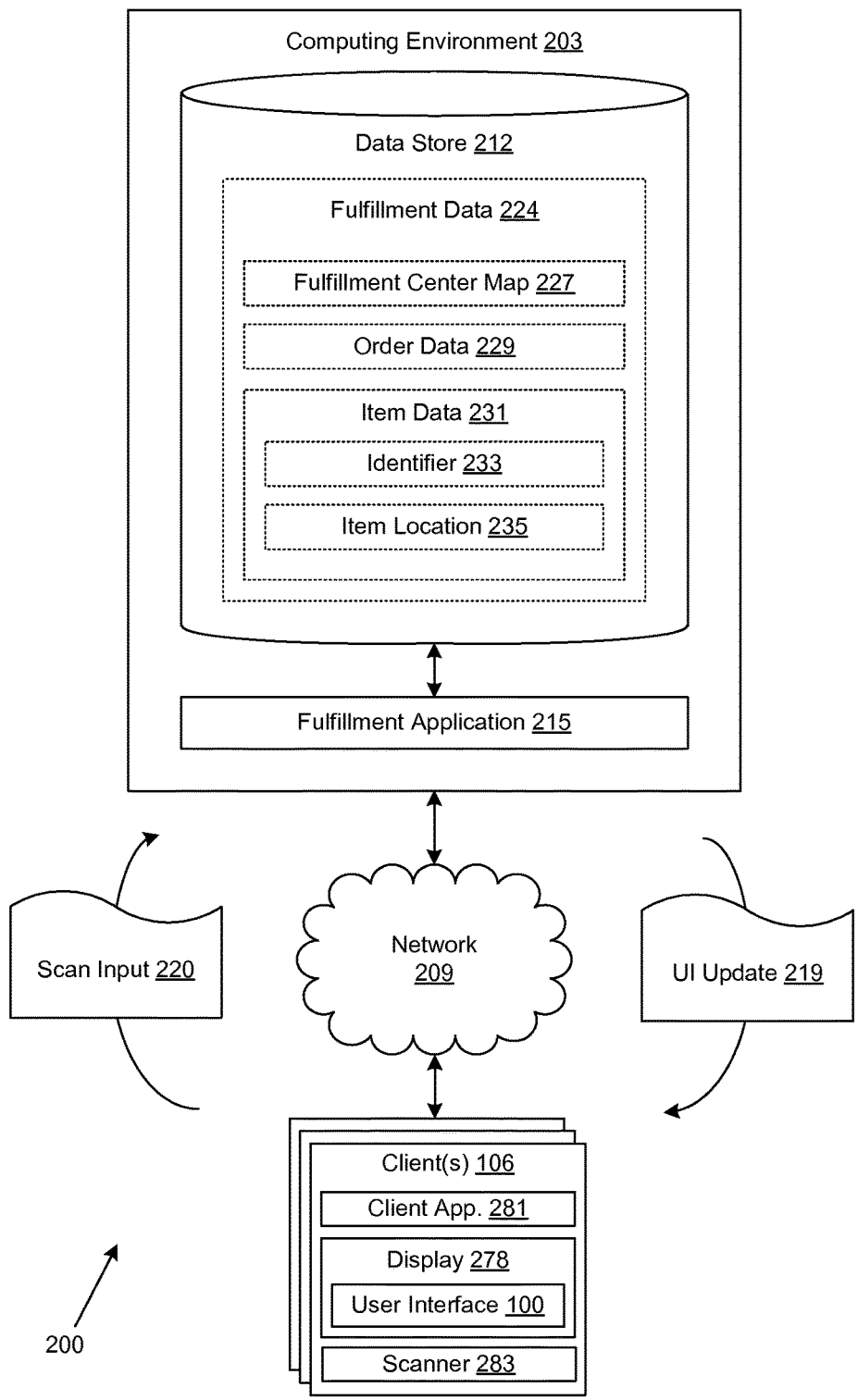
FIG. 2 is a drawing of a networked environment according to various implementations of the present disclosure.

With reference to FIG. 2, shown is a networked environment 200 according to various implementations. The networked environment 200 includes a computing environment 203 as well as one or more client devices 106 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various implementations. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a fulfillment application 215 and other applications, services, processes, systems, engines, or functionality not discussed in detail herein. The fulfillment application 215 is executed in order to facilitate fulfillment tasks within a fulfillment center. For example, the fulfillment application 215 can provide information about one or more tasks performed by workers within a fulfillment center, such as the location of an item that the worker is directed to retrieve. It should be appreciated that while discussion of the fulfillment application 215 is made in the context of fulfillment of orders made by users or customers of an electronic commerce system via a fulfillment center, that the fulfillment application can also facilitate stocking of items in the fulfillment center, or the stowing of items. To this end, the fulfillment application 215 can provide information about the location of a bin within the fulfillment center in which the worker is directed to stow an item that is being stocked.

The data stored in the data store 212 includes, for example, fulfillment data 224. The fulfillment data 224 includes data with which the fulfillment application 215 can facilitate fulfillment of items via a fulfillment center in response to orders that are placed by users or customers of an electronic commerce system. In other words, the fulfillment application 215 can initiate locating, retrieval from a stowage location, packing, and subsequent shipment of an item to a user ordering the item via an electronic commerce system. In one embodiment, the fulfillment data 224 can include a fulfillment center map 227, which contains information about the location of items, bins or other stowage locations in which items can be stored within one or more fulfillment center.

The fulfillment center map 227 can identify one or more bins or stowage locations by an identifier as well as information about where in the fulfillment center the bin and/or stowage location are located. For example, a given bin can be identified by a floor, row number, shelf number, bin location, or any other information from which a worker and/or robot within a fulfillment center can be located. The fulfillment application 215, using the fulfillment center map 227, can facilitate the routing of workers within one or more fulfillment centers for efficient fulfillment of orders via the fulfillment centers.

Fulfillment data 224 can also include order data 229 from which fulfillment application 215 can initiate fulfillment of items. Order data 229 can include information about orders placed by users via an electronic commerce system and the fulfillment application 215 can direct a worker and/or robot within a fulfillment center to retrieve the item from a location within the fulfillment center based upon the order data 229. For example, the order data 229 can include information about which items are associated with a particular order, a class of shipping associated with an order (e.g., shipping speed), a class of fulfillment associated with the order (e.g., fulfillment speed), or other information with which the fulfillment application 215 can determine when and how a particular item associated with an order should be retrieved and shipped to a recipient.

Item data 231 includes information about items that are stocked within a fulfillment center. Item data 231 can include information such as product descriptions, specifications, or other information. Item data 231 can also include an item identifier 233 with which the item can be uniquely identified within a fulfillment center in which it is stocked. Item data 231 can also include an item location 235, which can identify one or more locations within a fulfillment center in which an item is stocked. The item location 235 can also identify how many of a particular item are stocked in a given location. Such a location can be identified by one or more of a bin identifier, a floor number, a row number, shelf number, region or other data by which a given location can be identified within a fulfillment center.

The client device 106 is representative of a plurality of client devices that may be coupled to the network 209. The client device 106 may comprise, for example, a processor-based system such as a computer system. Such a computer system may be embodied in the form of a handheld device having an integrated barcode scanner and display, a handheld device having an integrated image capture device and display, a desktop computer, a laptop computer, personal digital assistants, cellular telephones, smartphones, set-top boxes, music players, web pads, tablet computer systems, game consoles, electronic book readers, or other devices with like capability. The client device 106 may include a display 278. The display 278 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The client device 106 may be configured to execute various applications such as a client application 281 and/or other applications. The client application 281 may be executed in a client device 106, for example, to access network content served up by the computing environment 203 and/or other servers, thereby rendering a user interface 100 on the display 278. The client application 281 may, for example, correspond to a browser, a mobile application, etc., and the user interface 100 may correspond to a network page, a mobile application screen, etc. The client device 106 may be configured to execute applications beyond the client application 281 such as, for example, browsers, mobile applications, email applications, social networking applications, and/or other applications.

The client device 106 can also include a scanner 283, which can include a barcode reader that can capture and convert barcodes to numeric and/or alphanumeric identifiers. The scanner 283 can take the form of an optical barcode reader that employs a light source and/or light sensor to decode barcodes. The scanner 283 can also take the form of a camera or other image capture device as well as associated logic executed by the client device 106 that can convert the barcode to a numeric and/or alphanumeric identifier. The scanner 283 can be in communication with the client application 281 in order to facilitate tasks performed by a worker in a fulfillment center according to various embodiments of the disclosure. For example, the scanner 283 can detect a barcode and provide a corresponding identifier to the client application 281, which can transmit the barcode data to the fulfillment application 215 and/or take some other form action based upon data stored on the client device 106.

The scanner 283 can also be equipped to detect other types of visual indicators that may be placed in a fulfillment center that correspond to a location within the fulfillment center. Additionally, the scanner 283 may be physically separate from the client device 106 but in communication with the client device 106 and/or computing environment 203. For example, a visual indicator, such as barcode, guide markers, alphanumeric identifiers, or other types of tag or indicators can be placed on a floor, shelf, bin or other location within a fulfillment center to identify a particular floor, row, or other location within the fulfillment center. Accordingly, the scanner 283 may be mounted to a cart, forklift, or other type of device that may be manned by a worker and moved throughout the fulfillment center. As the scanner 283 detects such an indicator, the scanner 283 can communicate with the client device 106, which can forward information about the indicator to the computing environment 203. Alternatively, the scanner 283 may communicate directly with the computing environment 203 via the network 209.

The scanner 283 can also take the form of an RFID and/or NFC scanner that can detect RFID and/or NFC tags that are placed within a fulfillment center. Although the examples discussed herein may be discussed in the context of a barcode scanner, it should be appreciated that embodiments of the present disclosure may also be implemented with other types of scanning technologies. Additionally, the client device 106 may also be in communication with more than one type of scanner 283. For example, the client device 106 may have an integrated barcode scanner, RFID scanner and NFC scanner. Additionally, the client device 106 may be in communication with a cart-mounted scanner that detects location of the cart within a fulfillment center. The client device 106 can then communicate information about data scanned by any of these scanners to the fulfillment application 215.

Accordingly, the fulfillment application 215, according to various embodiments of the disclosure, can generate a user interface update 219, which is transmitted to the client device 106. The information in the user interface update 219 can be rendered within a user interface 100 shown on the display 278 of the client device 106. For example, the user interface update 219 can include information associated with various data fields in a user interface 100 configured to display structured data in various corresponding locations within the user interface 100. As one example, the user interface update 219 can include information about a next item that should be retrieved by a worker in a fulfillment center. The information can include descriptive information about the item, an item identifier, as well as a floor, row, bin, shelf and/or other data about the location of the item within the fulfillment center.

In one embodiment, the client application 281 can emphasize certain information shown in the user interface 100 to facilitate user perception of the information that has changed in response to a user interface update 219. For example, the client application 281 can emphasize information about the location of the item within the fulfillment center that has changed relative to previous information displayed in the user interface 100. For example, if a user interface update 219 includes information about a subsequent item that indicates a new bin number, but a floor and row location of the item remain unchanged, the client application 281 can emphasize the bin number of the item. The bin number, in this example, is the only location information about the item that has changed relative to the previous item for which information was displayed in the user interface 100. In this way, a worker in a fulfillment center can more easily perceive information in the user interface 100 by observing the emphasized information. The client application 281 can also deemphasize information about the location of the item within the fulfillment center that has not changed relative to the previous information displayed in the user interface 100.

In some embodiments, the client application 281 can maintain state information about information that is displayed in the user interface 100 in order to determine which text within the user interface 100 should be emphasized and/or deemphasized. In other embodiments, the fulfillment application 215 can maintain state information about information rendered by the client device 106 and generate a user interface update 219 that includes information about which text within the user interface 100 should be emphasized and/or deemphasized.

Text can be emphasized by enlarging, bolding, underlining, modifying a transparency level of the text, modifying typeface or fonts, or performing other changes to the text characteristics of the text shown in the user interface. Text may also be emphasized by generating an animated transition effect so that a user can observe the changing of the text by way of the animation. For example, such an animated transition can take the form of sliding text, rotating text, fading in and/or out, or any other animated transition with which text can be updated and/or changed. Text can be deemphasized by reducing a text size of the text, increasing a transparency level of the text, or performing other changes to the text characteristics of the text.

In various embodiments of the disclosure, a user interface update 219 can be generated by the fulfillment application 215 and/or client application 281 in response to receiving a scan input 220 that corresponds to a barcode associated with an item, a bin, a shelf location, row location, or any other barcode, tag, visual indicator, etc., that is detected by a scanner 283 as a worker moves through a fulfillment center to perform various tasks. Accordingly, upon receiving a scan input 220 from the client device 106, the fulfillment application 215 can generate a user interface update 219 that corresponds to a next task to be performed by the worker. For example, the next task can correspond to the next item that should be retrieved by the worker from a location within the fulfillment center or a next location to which the worker should proceed within the fulfillment center.

For example, a worker may scan, via the client device 106, a barcode associated with a particular item that is retrieved by the worker within the fulfillment center. Accordingly, the user interface update 219 in response to such a scan input 220 can direct the worker to a particular floor and/or row within a fulfillment center. In this example, the user interface update 219 can comprise the information needed by the worker to perform the next step (e.g., to proceed to a particular floor). When the worker approaches and/or arrives at the directed location within the fulfillment center, a scanner 283, such as a cart mounted scanner providing location information by detected floor-mounted visual location indicators, can detect that the worker has arrived at the directed location and provide a scan input 220 to the fulfillment application 215. In response, a user interface update 219 generated by the fulfillment application 215 can comprise the information needed by the worker to perform the next step of a task (e.g., to proceed to a particular row).

When the worker arrives at the directed location, a scanner 283 can again detect that the worker has arrived at the location and provide an updated scan input 220 to the fulfillment application 215. In response, a user interface update 219 generated by the fulfillment application 215 can comprise the information needed by the worker to perform the next step of a task (e.g., to pick an item from a particular bin). In this way, step-by-step instructions can be provided to a worker in a fulfillment center by emphasizing information that is relevant to the worker to perform the individual steps of a given task.

Figure 3A:
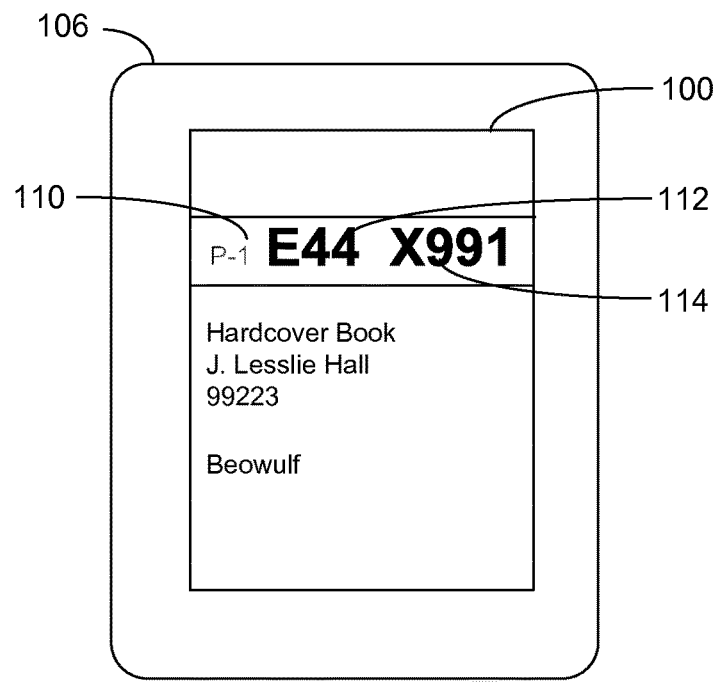
FIG. 3A is drawing depicting a user interface depicting a user interface element that is rendered and facilitated by embodiments of the present disclosure.

Referring next to FIG. 3A, shown is an example of a user interface 100 further illustrating various examples of how text may be emphasized and/or deemphasized within a user interface 100 according to various embodiments of the disclosure. The user interface 100 shown in FIG. 3A continues the examples of FIGS. 1A-1B. In the example of FIG. 3A, the user interface 100 is rendered in response to receiving a user interface update 219 that is in turn obtained in response to a scan input 220 generated by the client device 106. As described above, the user interface update 219 can include an identifier of an item, bin, row and/or any other location within a fulfillment center, and the user interface update 219 can include information about a next task for a worker in a fulfillment center, such as a location of a next item to be retrieved by the worker.

As shown in FIG. 3A, the floor identifier 110 corresponding to the next item and shown in the user interface 100 has been deemphasized, as the text remains unchanged relative to the previous user interface of FIG. 1B. The floor identifier 110 has been deemphasized because the next item to be picked may be located on the same floor as the item corresponding to the previous user interface of FIG. 1B. The floor identifier 110 has been deemphasized by increasing the transparency level and/or coloring of the text. Conversely, the row identifier 112 and bin identifier 114 have changed relative to the previous user interface of FIG. 1B because the next item may be located within a row and bin that are different from the location of the item corresponding to the previous user interface 100 of FIG. 1B. Therefore, the text corresponding to the row identifier 112 and bin identifier 114 has been emphasized by enlarging and/or bolding the associated text.

In the example of FIG. 3A, the row identifier 112 and bin identifier 114 have been emphasized because the item that a worker in a fulfillment center is directed to retrieve is located in a particular bin that is in a different row and bin relative to the item corresponding to the user interface of FIG. 1B. However, the item corresponding to the user interface of FIG. 3A is located on the same floor as the item corresponding to the user interface of FIG. 1B. In this way, information that may be relevant to a user (e.g., a worker in a fulfillment center), that has changed can be emphasized, whereas information that remains unchanged relative to a previous user interface can be deemphasized so that the user's attention can be focused on the changing information rather than on the information that remains unchanged.

Figure 3B:
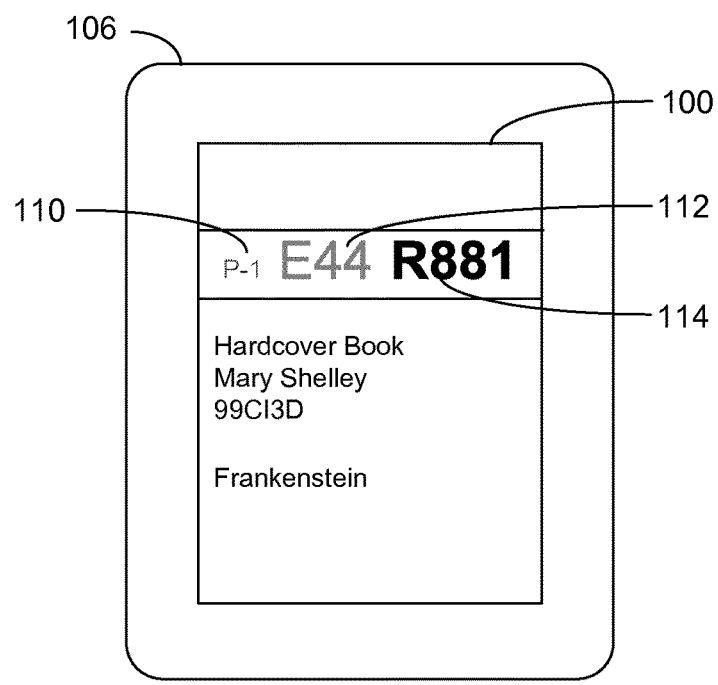
FIG. 3B is drawing depicting a user interface depicting a user interface element that is rendered and facilitated by embodiments of the present disclosure.

Continuing the example of FIG. 3A, reference is now made to FIG. 3B, which illustrates the user interface 100 rendered by the client device 106 upon receiving a user interface update 219. As shown in FIG. 3B, the floor identifier 110 and row identifier 112 have been deemphasized, as they remain unchanged relative to the previous user interface 100 shown in FIG. 3A. In the example of FIG. 3B, the floor identifier 110 and row identifier 112 can be deemphasized if the next item, or the item corresponding to the user interface 100 shown in FIG. 3B, is located on the same floor and in the same row as the previous item, or the item corresponding to the user interface 100 of FIG. 3A. In contrast, the bin identifier 114 has been emphasized because its text has changed relative to the user interface of FIG. 3A and because the item corresponding to the user interface 100 of FIG. 3B is located in a different bin than the item corresponding to the user interface 100 of FIG. 3A.

Additionally, FIG. 3A also illustrates how text appearing within the user interface 100 can be emphasized and/or deemphasized in stages based upon how recently its text has changed. For example, because the floor identifier 110 has remain unchanged for more than one user interface update 219, its text can be deemphasized to a greater degree than the row identifier 112, whose text has remain unchanged for only one user interface update 219 received by the client device 106. In this scenario, the floor identifier 110 can remain unchanged for more than one user interface update 219 if consecutive items corresponding to user interfaces 100 rendered by the client device 106 are located on the same floor.

Figure 3C:
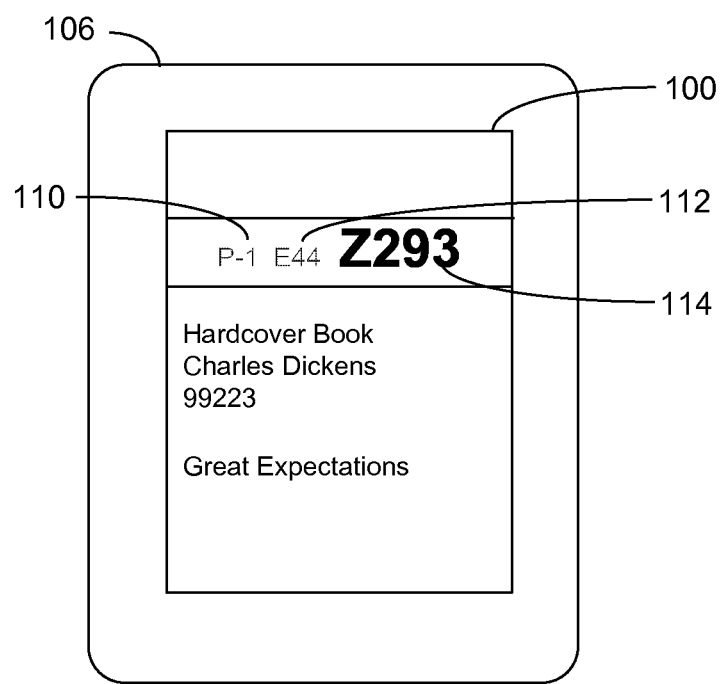
FIG. 3C is drawing depicting a user interface depicting a user interface element that is rendered and facilitated by embodiments of the present disclosure.

FIG. 3C continues the example of FIG. 3B by illustrating how the row identifier 112 has been deemphasized to a greater degree, just as the floor identifier 110 has, because its text has remain unchanged for more than one user interface update 219. In this scenario, the row identifier 112 can remain unchanged for more than one user interface update 219 if consecutive items corresponding to user interfaces 100 rendered by the client device 106 are located in the same row.

Figure 4:
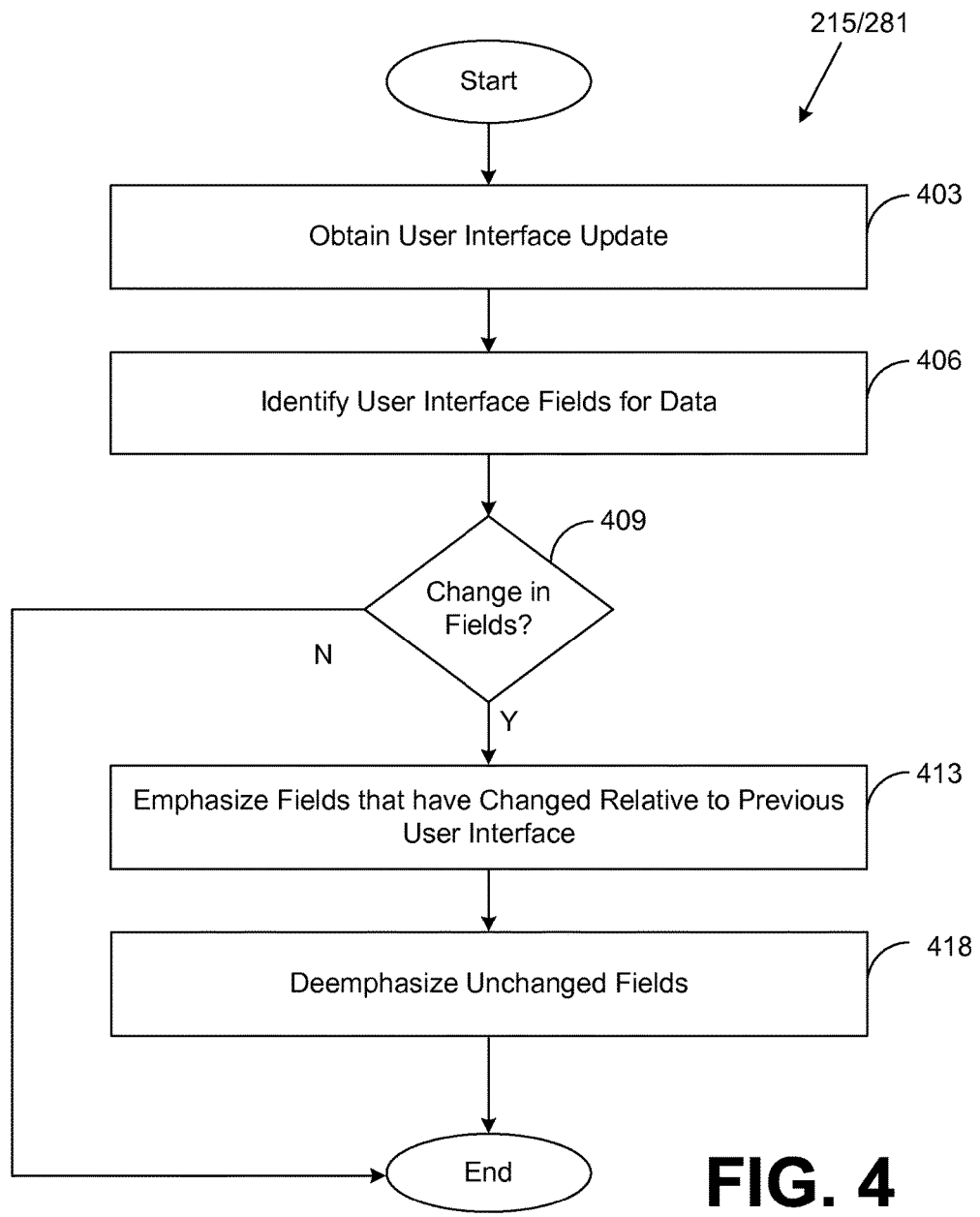
FIG. 4 is a flowchart illustrating one example of functionality implemented as portions of a method according to various implementations of the present disclosure.

Referring next to FIG. 4, shown is a flowchart that provides one example of the operation of a portion of the fulfillment application 215 and/or client application 281 according to various implementations. It is understood that the flowchart of FIG. 4 provides merely an example of the many different types of functional arrangements that may be employed to implement the operation of the portion of the fulfillment application 215 and/or client application 281 as described herein. As an alternative, the flowchart of FIG. 4 may be viewed as depicting an example of steps of a method implemented in the computing environment 203 and/or client device 106 according to one or more implementations.

Beginning with box 403, the fulfillment application 215 and/or client application 281 can obtain a user interface update 219. As noted above, the user interface update 219 can contain information populated within data fields in a user interface 100 containing structured data. For example, the user interface update 219 can contain information about the location of an item within a fulfillment center that a worker is directed to retrieve as part of a fulfillment process.

The item can be associated with an order processed by an electronic commerce system that is to be packaged and shipped from the fulfillment center. The information about the item can include, for example, a floor identifier, row identifier and/or bin identifier corresponding to a respective floor, row and/or bin within the fulfillment center where the item is located or stowed. The information in a user interface update 219 that is associated with the item can also include any other location information about the item that may assist a worker with locating the item in the fulfillment center.

In box 406, the fulfillment application 215 and/or client application 281 identifies the data fields within the user interface 100 rendered upon the display 278 of the client device 106. For example, the fulfillment application 215 and/or client application 281 can identify those data fields in the user interface 100 that correspond to the information in the user interface update 219. In one embodiment, these data fields can correspond to a floor identifier 110, row identifier 112 and bin identifier 114 that are associated with a particular floor, row and bin of an item that a worker in a fulfillment center is directed to retrieve or stow.

At box 409, the fulfillment application 215 and/or client application 281 determines whether any of the fields within the user interface 100 have changed. For example, the fulfillment application 215 and/or client application 281 identifies which of a floor identifier 110, row identifier 112 and/or bin identifier 114 corresponding to a user interface update 219 have changed relative to a previous user interface 100 rendered by the client device 106. If no information has changed relative to a previous user interface 100 rendered by the client device 106, the method proceeds to completion, as there is no updated information to display within the user interface 100.

If fields within the user interface 100 have changed, then in box 413, the fulfillment application 215 and/or client application 281 updates the user interface 100 and emphasizes text that has changed relative to the information previously displayed within the user interface 100. The fulfillment application 215 and/or client application 281 then deemphasizes text appearing within the user interface 100 that has remain unchanged relative to the information previously displayed within the user interface 100. For example, an item corresponding to the user interface update 219 that is associated with a next item to be retrieved by a worker in a fulfillment center may be located in or on a floor, row and/or bin having a respective identifier that is different than an item corresponding to a previous user interface 100 rendered by the client device 100. Accordingly, if a floor identifier 110, row identifier 112 and/or bin identifier 114 within the user interface 100 have changed relative to the previous user interface 100, this information can be emphasized by the fulfillment application 215 and/or client application 281 in the user interface 100.

In box 418, if any of the information associated with the location of the item in the fulfillment center remains unchanged relative to the previous user interface 100, such information can be deemphasized by the fulfillment application 215 and/or client application 281. For example, should the next item to be retrieved by a worker in a fulfillment center be located in or on a floor, row or bin having a respective identifier that is the same as an item corresponding to the previous user interface 100 rendered by the client device 100, the unchanged information can be deemphasized by the fulfillment application 215 and/or client application 281 in the user interface 100. Thereafter, the process proceeds to completion.

Figure 5:
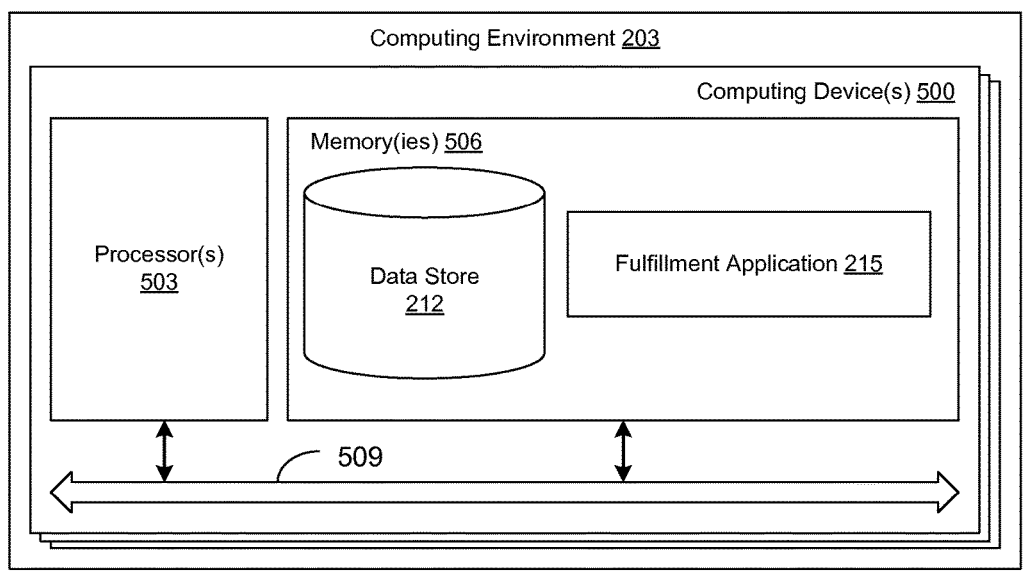
FIG. 5 is a schematic block diagram that provides one example illustration of a computing environment employed in the networked environment of FIG. 2 according to various implementations of the present disclosure.

With reference to FIG. 5, shown is a schematic block diagram of the computing environment 203 according to an implementation of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the fulfillment application 215 and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the fulfillment application 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the fulfillment application 215 and/or a client application 281. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some implementations, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the fulfillment application 215 that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described implementations of the present disclosure are merely possible examples of implementations set forth for a clear understanding of the principles of the disclosure. Many variations and modifications may be made to the above-described implementation(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable by a client device, the client device comprising a display and a scanner, the program configured to cause the client device to at least:

receive a first user interface update of a user interface from a fulfillment application executed by at least one computing device, the user interface comprising a plurality of data fields, the first user interface update comprising information with which the data fields of the user interface can be populated with a respective location within a fulfillment center of a first item;

render the first user interface update within the user interface on the display by rendering the information from the first user interface update in the data fields of the user interface;

receive a second user interface update from the fulfillment application, the second user interface update comprising information with which the data fields of the user interface can be populated with a second respective location of a second item in the fulfillment center;

identify at least a subset of the data fields that are different relative to the first user interface update and the second user interface update;

render the second user interface update within the user interface by visually emphasizing the at least a subset of the data fields that are different relative to the first user interface update and the second user interface update and visually deemphasizing a remainder of the data fields that are unchanged relative to the first user interface update and the second user interface update, wherein the visually deemphasizing is performed by increasing a transparency associated with the remainder of the data fields that are unchanged relative to the first user interface update and the second user interface update;

receive a third user interface update from the fulfillment application, the third user interface update comprising information with which the data fields of the user interface can be populated with a third respective location of a third item in the fulfillment center;

identify at least a subset of the data fields that are different relative to the first user interface update, the second user interface update, and the third user interface update; and render the third user interface update within the user interface by visually emphasizing the at least a subset of the data fields that are different relative to the second user interface update and the third user interface update, visually deemphasizing unchanged data fields between the second user interface update and the third user interface update, and further visually deemphasizing unchanged data fields that are unchanged relative to the first user interface update, the second user interface update, and the third user interface update to a greater degree relative to data fields that are unchanged relative to the first user interface update and the second user interface update.

2. The non-transitory computer-readable medium of claim 1, wherein the first user interface update is rendered in response to the program obtaining a scan from the scanner and transmitting data associated with the scan to the fulfillment application.

3. The non-transitory computer-readable medium of claim 1, wherein the first user interface update and the second user interface update further comprise instructions to personnel within the fulfillment center to retrieve the first item and the second item.

4. The non-transitory computer-readable medium of claim 1, wherein the program causes the client device to render the second user interface update and visually emphasize by enlarging text associated with the at least a subset of the data fields within the user interface.

5. The non-transitory computer-readable medium of claim 4, wherein the program causes the client device to render the second user interface update and visually emphasize by animating a transition of text that is different between the first user interface update and the second user interface update.

6. A system, comprising:
at least one computing device; and
a fulfillment application executable in the at least one computing device, the fulfillment application causing the at least one computing device to at least:
receive data associated with a first scan from a client device associated with a fulfillment center;
identify a first user interface rendered upon a display of the client device, the first user interface comprising a plurality of data fields comprising information about the fulfillment center;
generate a second user interface for rendering upon the display of the client device by emphasizing individual ones of the data fields having changed between the first user interface and the second user interface and deemphasizing unchanged ones of the data fields that are unchanged between the first user interface and the second user interface, wherein deemphasizing is performed increasing a transparency of a typeface associated with the unchanged ones of the data fields;
transmit the second user interface to the client device;
receive data associated with a second scan from the client device;
generate a third user interface for rendering upon the display of the client device by emphasizing individual ones of the data fields having changed between the second user interface and the third user interface, deemphasizing unchanged ones of the data fields that are unchanged between the second user interface and the third user interface, and further deemphasizing unchanged ones of the data fields that are unchanged between the first user interface, the second user interface, and the third user interface to a greater degree relative to deemphasized data fields that are unchanged between the first user interface and the second user interface; and
transmit the third user interface to the client device.

7. The system of claim 6, wherein the first scan and second scan correspond to a barcode scanned by a scanner in communication with the client device.

8. The system of claim 6, wherein the data fields correspond to a location of an item within the fulfillment center.

9. The system of claim 8, wherein the data fields identify at least one of a floor, a row, or a bin corresponding to the location of an item within the fulfillment center.

10. The system of claim 6, wherein the data fields correspond to a bin location in which to stock an item within the fulfillment center.

11. The system of claim 6, wherein the fulfillment application generates the second user interface by enlarging text associated with the individual ones of the data fields having changed between the first user interface and the second user interface.

12. The system of claim 11, wherein the fulfillment application generates the second user interface by generating an animated transition between text associated with the individual ones of the data fields having changed between the first user interface and the second user interface.

13. The system of claim 6, wherein the fulfillment application generates the second user interface by deemphasizing text associated with a remainder of the data fields being unchanged between the first user interface and the second user interface.

14. The system of claim 13, wherein the fulfillment application generates the second user interface by increasing a transparency level associated with text associated with the remainder of the data fields being unchanged between the first user interface and the second user interface.

15. A method, comprising:
receiving, by a client device, a first user interface update corresponding to a user interface rendered upon a display of the client device, the first user interface update corresponding to individual ones of a plurality of data fields within the user interface;
identifying, by the client device, that a particular data field is unchanged by the first user interface update;
applying the first user interface update by deemphasizing, by the client device, text corresponding to the particular data field of the plurality of data fields based at least in part on identifying that the particular data field is unchanged by the first user interface update, wherein deemphasizing is performed by increasing a transparency of the text corresponding to the particular data field;

receiving, by the client device, a second user interface update corresponding to the user interface rendered upon the display of the client device;

identifying, by the client device, that at least one data field of the plurality of data fields is changed by the second user interface update and the particular data field is unchanged by the second user interface update;

applying the second user interface update by emphasizing, by the client device, text corresponding to the at least one data field of the plurality of data fields of the user interface based at least in part on identifying that the at least one data field is changed by the second user interface update; and applying the second user interface update by further deemphasizing, by the client device, text corresponding to the particular data field to a greater degree relative to the first user interface update based at least in part on identifying that the particular data field is unchanged by the first user interface update and the second user interface update.

16. The method of claim 15, wherein emphasizing the text corresponding to the at least one data field of the plurality of data fields comprises enlarging, by the client device, the text corresponding to the at least one data field of the plurality of data fields.

17. The method of claim 15, wherein emphasizing the text corresponding to the at least one data field of the plurality of data fields comprises generating an animated transition associated with the text corresponding to the at least one data field of the plurality of data fields.

18. The method of claim 15, further comprising deemphasizing, by the client device, text corresponding to a data field that is changed by the first user interface update and unchanged by the second user interface update.

19. The method of claim 18, wherein further deemphasizing the text corresponding to the particular data field to a greater degree comprises decreasing a text size of the text corresponding to the particular data field.

\* \* \* \* \*